United States Patent [19]
Hulbert et al.

[11] Patent Number: 5,740,208
[45] Date of Patent: Apr. 14, 1998

[54] INTERFERENCE CANCELLATION APPARATUS FOR MITIGATING THE EFFECTS OF POOR AFFILIATION BETWEEN A BASE STATION AND A MOBILE UNIT

[75] Inventors: Anthony Peter Hulbert, Southampton; David Peter Chandler, Hampshire, both of Great Britain

[73] Assignee: Roke Manor Research Limited, England

[21] Appl. No.: 695,674

[22] Filed: Aug. 8, 1996

Related U.S. Application Data

[63] Continuation of Ser. No. 373,300, PCT/GB94/00583 Mar. 22, 1994.

[30] Foreign Application Priority Data

| Jun. 25, 1993 | [GB] | United Kingdom | 9313078 |
| Aug. 9, 1993 | [GB] | United Kingdom | 9316491 |

[51] Int. Cl.$^6$ .................................................. H04B 1/10
[52] U.S. Cl. ............................ 375/346; 345/350; 455/63; 455/296
[58] Field of Search ........................... 375/346, 350, 375/206; 455/56.1, 33.1, 62, 63, 54.1, 296, 33.2

[56] References Cited

U.S. PATENT DOCUMENTS

| 3,699,444 | 10/1972 | Ghose et al. | 455/304 |
| 4,434,505 | 2/1984 | Gutleber | 455/63 |
| 4,952,193 | 8/1990 | Talwer | 455/63 |
| 5,109,528 | 4/1992 | Uddenfeldt | 455/33.2 |
| 5,148,548 | 9/1992 | Meche et al. | 455/62 |
| 5,428,818 | 6/1995 | Meidan et al. | 455/63 |

FOREIGN PATENT DOCUMENTS

| 0454638 | 10/1991 | European Pat. Off. |  |
| 2 195 513 | 7/1988 | United Kingdom . |  |
| 2276064 | 9/1994 | United Kingdom | 375/350 |
| WO/9208325 | 5/1992 | WIPO . |  |

OTHER PUBLICATIONS

"Recent results concerning the benefit of joint detection in CDMA systems", P.W. Baier, IEE Colloquium on Spread Spectrum Techniques for Radio Communication Systems, Digest No. 095, Apr. 27, 1993, pp. 5/1–4.

"Selective handover for traffic balance in mobile radio communications", by T. Fujii et al., Supercomm/ICC International Conference on Communications, Jun. 1992, vol. 4, pp. 1840–1846.

"Hand–off procedure for fuzzy defined radio cells", D. Munoz–Rodriquez et al., 37th IEEE Vehicular Technology Conference, Jun. 1987, pp. 38–44.

Great Britain Patent Application No. 9304901.3.

*Primary Examiner*—Temesghen Ghebretinsae
*Attorney, Agent, or Firm*—Hill, Steadman & Simpson

[57] ABSTRACT

The apparatus includes circuitry for determining which base station a mobile unit should be affiliated to for best reception, and circuitry for maintaining affiliation with the base station to which the mobile is currently connected. Cancellation circuitry is provided for cancelling the interference caused as a result of the mobile unit being affiliated to the base station giving non-optimum reception.

20 Claims, 11 Drawing Sheets

INTERFERENCE CANCELLATION APPARATUS FOR MITIGATING THE EFFECTS OF POOR AFFILIATION BETWEEN A BASE STATION AND A MOBILE UNIT

This is a continuation of application Ser. No. 08/373,300, filed Jan. 23, 1995.

BACKGROUND OF THE INVENTION

The present invention relates to apparatus for use in equipment providing a digital radio link between a fixed and a mobile radio unit.

Equipment for providing such a radio link is described in Great Britian patent application number 9304901.3, which describes the use of Wiener-like filters for providing good estimates of the amplitude of the inphase I, the quadrature phase Q, components of, for example, the spread spectrum pilot signal.

In a cellular mobile radio system employing direct sequence code division multiple access (CDMA) it is possible to re-use the same carrier frequency in adjacent cells. However, traditionally this has only worked well if it can be guaranteed that every mobile communicates through the base station to which it has the best communication path at all times. For mobiles well within the boundary of a particular cell this does not cause problems because the optimum base station will almost always be the base station serving the cell in which that mobile is placed. However, consider the example shown in FIG. 1, where the mobile 2 is meandering along the cell boundary so that its path and therefore its optimum affiliation is varying between the two base stations as shown in FIG. 2. With reference to FIG. 2, it can be seen that as the mobile 2 meanders between points A and B the receiving strength is shown accordingly with reference to the base station 4 and the base station 6. The boxed section as shown in FIG. 2 shows the preferred base station that should be used. The clear boxes represent base station 4 and the hatch boxes represent base station 6.

In a real situation the variation in signal strength is more likely to be due to variations in the shadowing (e.g. due to buildings) over the paths from the two base stations. This will cause no difficulties if the mobile is moving slowly from the region in which one base station is optimum to the region in which the other base station is preferred. Essentially, as the optimum affiliation changes, the network can be arranged to force a handover so that the mobile will continue to communicate through the better base station.

However, if the mobile is moving very rapidly and/or if the variations in shadowing are spatially very frequent, these handovers could be required more often than the network can service. In this case the mobile could spend a significant proportion of the time affiliated to the wrong base station. For all of the time that this is the case, assuming downlink power control is operational the base station has to transmit more power to the mobile than would need to be transmitted from the other base station. Since the CDMA cellular mobile network is interference limited, these periods of incorrect affiliation will result temporarily in degraded overall system capacity.

Traditionally, the solution to the above problem has been to use so called 'soft handoff'. In this situation, it is arranged that, for mobiles at or near to the cell boundary, the downlink signal power is transmitted from the two nearest base stations contemporaneously. This allows short term variations in the paths to be accommodated by rapidly varying the proportions of power transmitted from the two base stations.

An alternative known method of solving the problem is to use instantaneous hard handoff in which the mobile is able to request, at a moments notice, that its communications path be switched from one base station to another. This facility can provide capacity which is comparable to that obtained from soft handoff. The instantaneous hard handoff can only be provided if the network supplies the information from the switch (e.g. the mobile switching centre) to both base stations simultaneously. For delay critical services, there would not be enough time for the base station newly handling the call to request the information from the mobile switching centre.

Thus, for a mobile operating either soft handoff or instantaneous hard handoff on the downlink, both base stations must be simultaneously supplied with the user data. This has been estimated to increase the traffic on the links from the mobile switching centre to the base stations, typically by 30–50%. For operators using leased lines to support these links, the costs associated with this additional traffic would be undesirable and might prove significant.

The present invention allows the mobile to remain affiliated to a base station even after a better path to another base station has been found. This will raise the level of interference, both within the cell through whose base station the mobile is operating and in the cell through whose base station the mobile should be operating. The additional interference is then substantially removed in the receivers of some of the mobiles, i.e. those mobiles to which the interference would otherwise be significant, operating in both cells, by means of interference cancellation.

The principle of interference cancellation in the context of direct spread spectrum CDMA systems is known. Essentially, the undesired signal is despread, demodulated and estimates of its carrier phase and amplitude for all significant multipath components, obtained from the received signal in a conventional way. All of this information is then used to reconstruct a near-replica of the unwanted signal at full spread bandwidth which is then added in anti-phase to a suitably delayed version of the total receiver input so as to tend to cancel it.

Interference cancellation does not work particularly well when the amplitudes of all of the signals are similar. Interference cancellation is obviously only applied to enable the demodulation of signals which could not be demodulated without it. If all the signals have similar amplitudes then, by definition, none of them can be demodulated with acceptably low error rate, without interference cancellation. However, if none of the signals can be demodulated before interference cancellation, the regenerated near-replicas for cancellation, will tend to be poor replicas because of the decision errors. This has two implications:

1) When all signals are of similar amplitude there is no special candidate for cancellation—therefore all signals (other than the one to be received) must be cancelled. This leads to a very high complexity receiver.
2) Since the replicas of the signals for cancellation are initially poor (due to decision errors), the cancellation achieved will be poor, although some cancellation will be achieved. Following cancellation, better demodulation of all of the signals is possible. This new demodulated data can be used to provide new remodulated signal replicas for cancellation which should be cancelled from the original received signal. Thus two, and in general, several cancellation passes may be applied to improve performance. However, the complexity of the receiver grows linearly with the number of passes.

Thus interference cancellation proves highly complex in the case where all of the signals are of similar amplitude. However, optimum communications capacity in the uplink of a CDMA cellular mobile system arise exactly in the case where power control is applied to the mobiles' transmit power so that all signals are received at the same level.

On the downlink, the situation is somewhat different. Downlink power control is applied so that all mobiles experience similar signal to interference ratios rather than, necessarily, similar power levels. Because the relative level of interference near the corner of cell is higher, typically by a factor of three, than the relative level of interference near the centre of the cell, downlink power control will tend to cause the received power levels at a mobile to vary over a range of typically 5 to 7 dB. Reception for mobiles near the centre of a cell may be aided if they first cancel some or all of the signals transmitted from their base station to the mobiles around the periphery of their cell. This might allow them to reduce their demand for received power from the base station which will reduce the total interference generated by that base station. This effect is not expected to improve capacity greatly however, because the mobiles closer to the base station only account for a relatively small proportion of the mobiles in a cell and because the power transmitted to them is smaller to begin with.

On the other hand, the mobiles near the edge of a cell are the ones already receiving the strongest signals from their base station so attempts to cancel any of the weaker signals are unlikely to meet with much success.

Now consider the case of a mobile which is, as it were, beyond the edge of its cell. All mobiles which are within the same cell will experience (as for any other signal) the transmissions to that mobile as interference. However, because the mobile's signal may be significantly larger, two points arise:

It is much easier to cancel because being a stronger signal it should be possible to demodulate, substantially without errors and at a level strong enough that good estimates of energy are readily made, and it is much more worth cancelling because being a stronger signal its interference is more significant.

So far the effect of increased base station transmit power to a mobile beyond its nominal cell boundary on the other users within that cell has only been considered. However, the increased total power transmitted from that base station will affect the reception for some of the mobiles affiliated to all of the base stations surrounding that base station. This is illustrated in FIG. 3.

In FIG. 3, mobile M1 is affiliated to base station A, even though it should ideally be affiliated to base station B. Because of this, the power transmitted from base station A to mobile M1 is larger than desired. Assuming that base station A does not have a sectored antenna, the component of the total power transmitted to mobile M1 will be radiated in all directions as illustrated by the dashed line arrows. Thus the increased transmission power to mobile M1 will increase interference levels, not only to the mobiles close to mobile M1 but to all mobiles close to the adjacent edge of their respective cells (i.e. mobiles M2 and M10). Thus these mobiles will also benefit from cancelling the transmissions from base station A to mobile M1.

Typically, a mobile may need to cancel signals from a maximum of about three base stations if it is close to the corner of a cell. Thus, for example, mobile M5, above may benefit from cancelling some of the transmission from base stations D (its own base station), E and A.

SUMMARY OF THE INVENTION

An object of the present invention is to provide interference cancellation means avoiding the requirement for soft handover or instantaneous hard handover without significant loss in network capacity.

According to the present invention there is provided apparatus for use in equipment providing a digital radio link between fixed and mobile radio units, said apparatus including means for determining which base station a mobile unit should be affiliated for best reception, means for maintaining affiliation with the base station with which the mobile unit is currently connected, and cancellation means for cancelling interference caused as a result of mobile unit being affiliated to the base station giving non-optimum reception.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
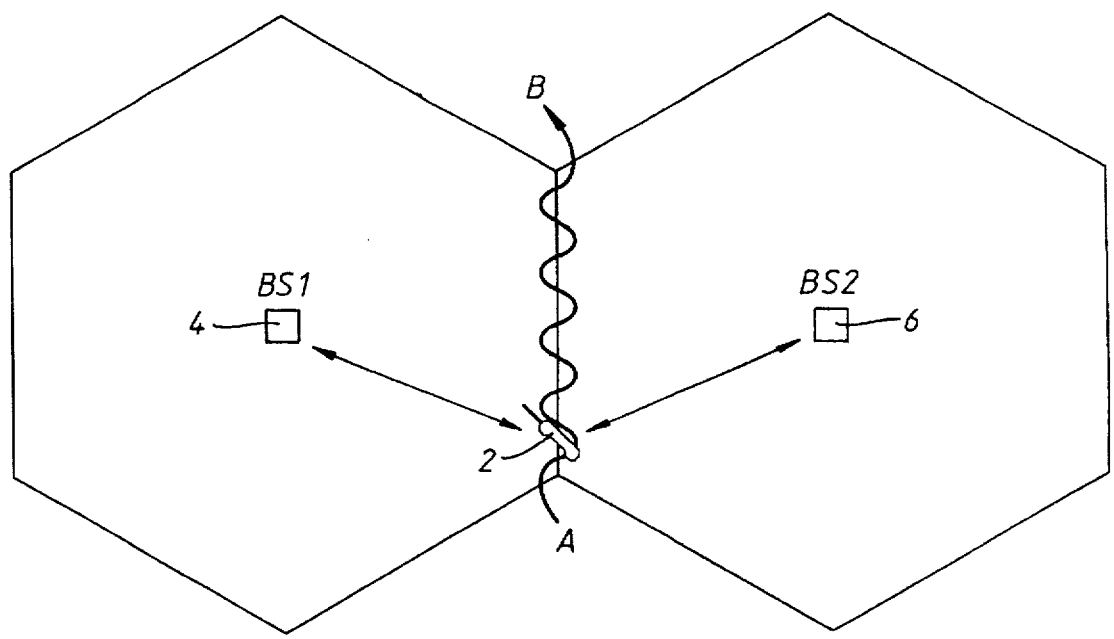
FIG. 1 depicts a mobile unit and two base station cells.
Figure 2:
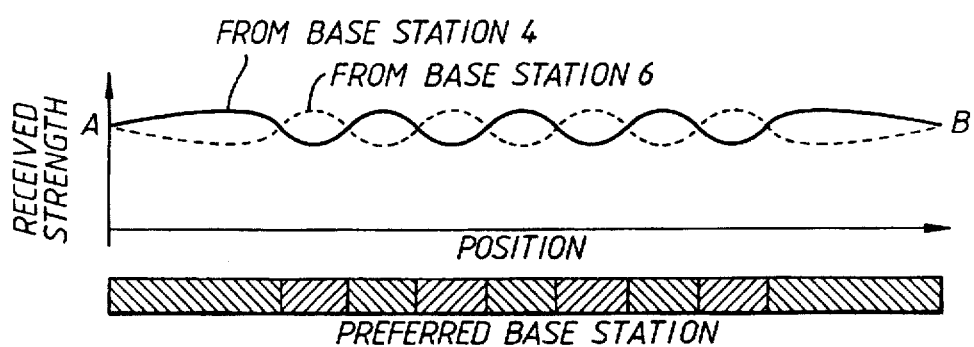
FIG. 2 depicts the change in signal strength at one of the FIG. 1 base stations.
Figure 3:
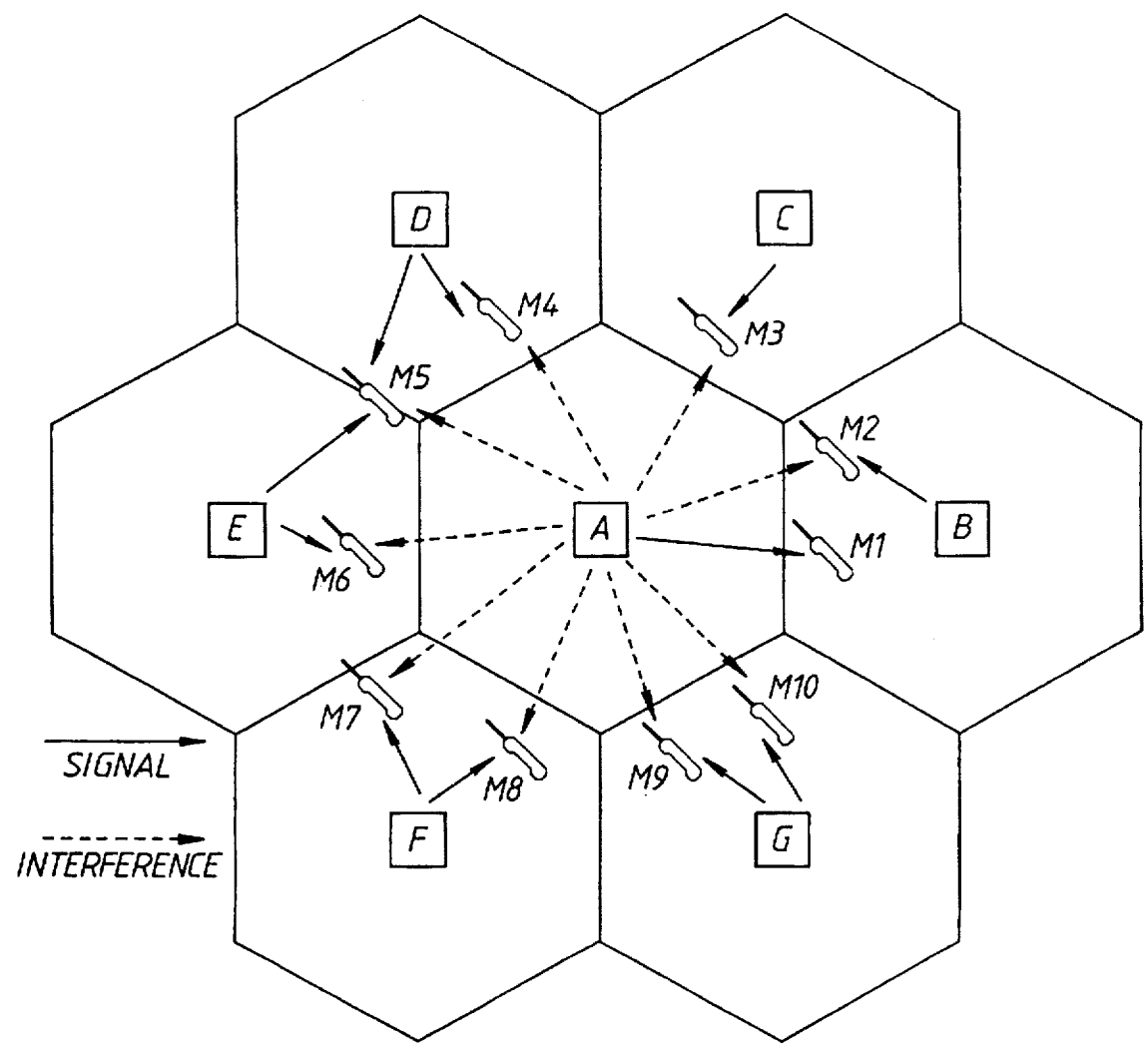
FIG. 3 depicts the relationship of a plurality of mobile units and base stations.
Figure 4:
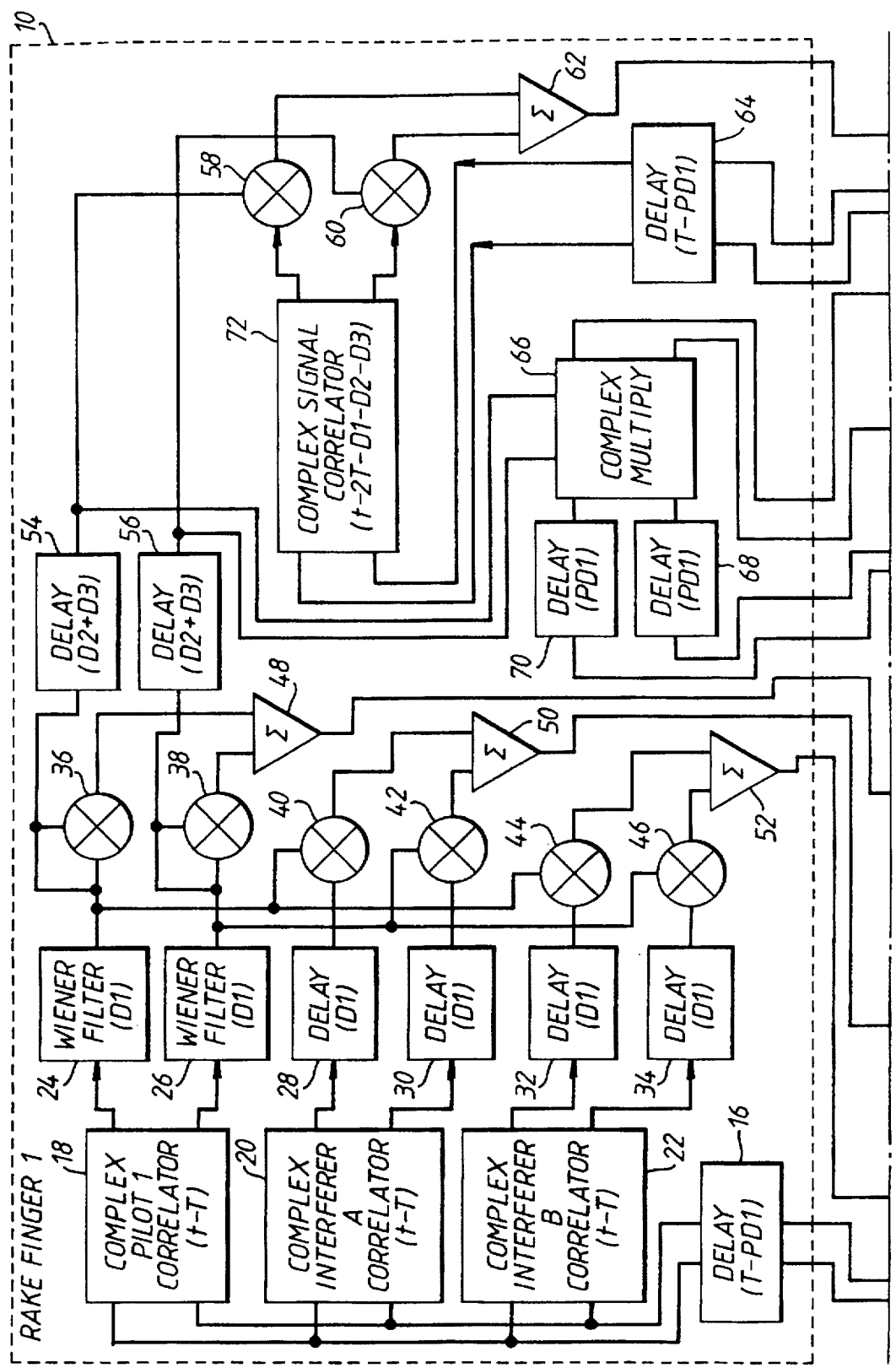
FIG. 4 shows a block diagram of an interference cancellor for interference emanating from the same base station.
Figure 4:
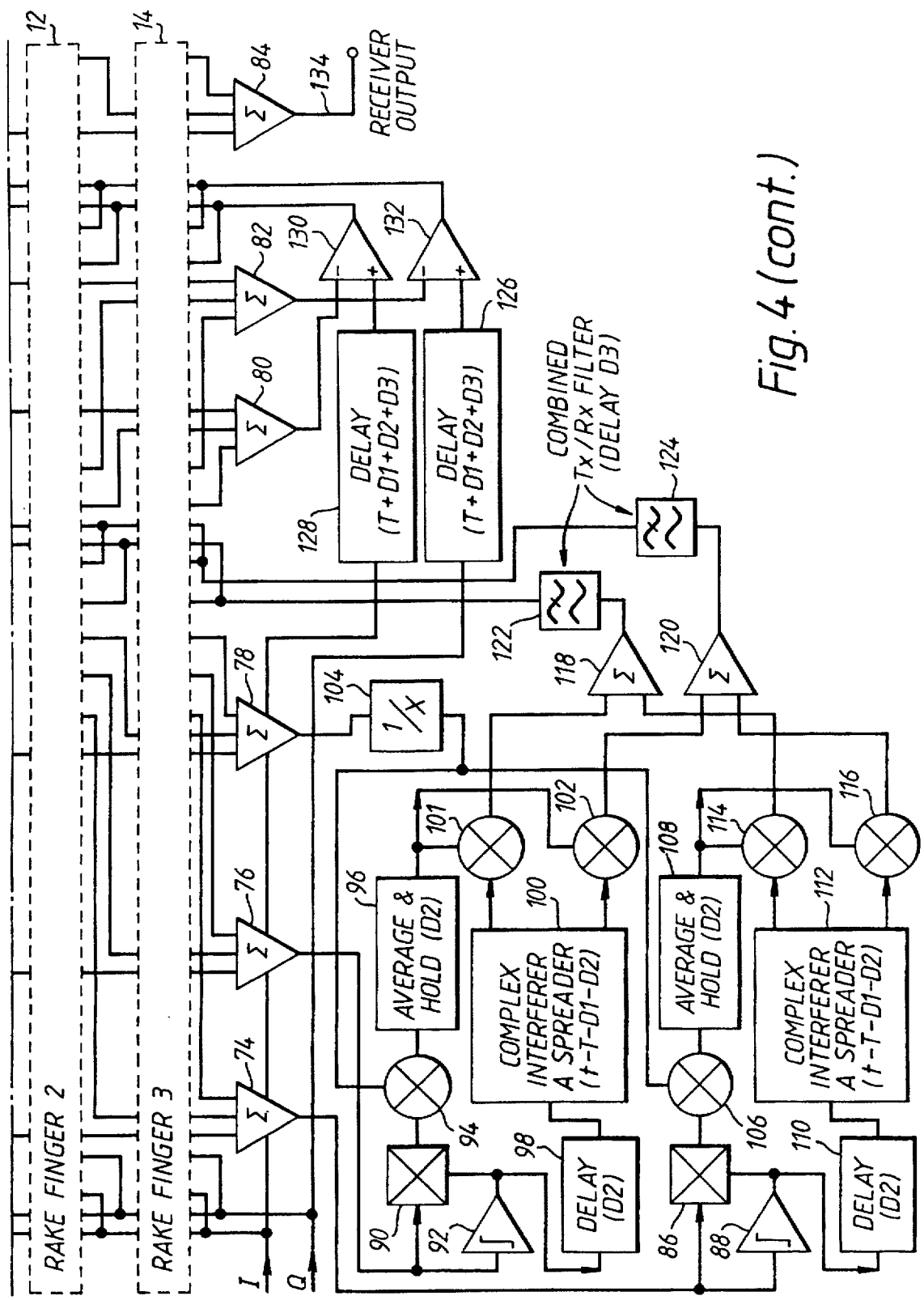

Referring to FIG. 4, the interference cancellor comprises a plurality of Rake fingers 10, 12, 14, and it will be appreciated that each Rake finger includes all the circuitry which will be described hereinafter with reference to the first Rake finger 10. The Rake finger 10 receives the inphase and quadrature phase signals on the incoming lines I, Q which are connected to a delay circuit 16. The delay circuit 16 has two output lines each being connected to an input of a complex pilot correlator 18, a complex interferer A and correlator 20, and a complex interferer B and correlator 22. The complex pilot correlator 18 has two output lines each being connected to a Wiener-like filter 24, 26 respectively, and the complex interferers and correlators 20, 22 each have a pair of output lines being connected to delay circuits 28 to 34 respectively. An output from the Wiener-like filter 24 is connected to each of two inputs of a multiplying circuit 36, to an input of a delay circuit 54, to an input of a multiplying circuit 40, to an input of a multiplying circuit 42 and to an input of a multiplying circuit 44. An output from the Wiener-like filter 26 is connected to each of two inputs of a multiplying circuit 38, to an input of a delay circuit 56, to an input of a multiplying circuit 42 and to an input of a multiplying circuit 46. An output of the multiplying circuits 36 and 38 are connected respectively to an input of an adder circuit 48. An output from each of the multiplying circuits 40, 42 are connected respectively to an input of an adder circuit 50, and an output from the multiplying circuits 44, 46 are connected respectively to an input of an adder circuit 52. The delay circuit 54 has an output connected to an input of a multiplying circuit 58 and to an input of a complex multiplying circuit 66. The delay circuit 56 has an output connected to an input of a multiplying circuit 60 and to a further input of the complex multiplying circuit 66. The complex multiplying circuit 66 has two further inputs each of which receive an output from a delay circuit 68 and 70 respectively. The delay circuits 68, 70 are connected respectively to output filters 124, 122 external to the Rake finger which will be described later. The complex multiplying circuit 66 has two output lines each being connected to circuitry external to the Rake finger which will be described later. Each Rake finger includes a further delay circuit 64 which has two input lines connected to circuitry external to the Rake finger and has two output lines each being connected to an input of a complex signal correlator 72. The complex signal correlator 72 has two output lines each being connected respectively to an input of the multiplying circuits 58, 60. The multiplying circuits 58, 60 have their outputs connected to an input of an adder circuit 62 respectively, the output of which is connected to circuitry external to the Rake finger. Similarly the adder circuits 48, 50, 52 have their respective outputs connected to circuitry external to the Rake finger.

The circuitry external to each of the Rake fingers will now be described. An adder circuit 74 receives at an input respectively, the output from the adder circuit 52 in Rake finger 10, and the corresponding outputs from the other Rake fingers. An output from the adder circuit 74 is connected to an input of a half linear multiplying circuit 86 and to a limiting device 88. An adder circuit 76 is connected to the output of the adder circuit 50 in Rake finger 10 and has its other inputs connected to the output of the adder circuits in the other Rake fingers respectively. An output from the adder circuit 76 is connected to an input of a half linear multiplying circuit 90, and to a limiting circuit 92. An adder circuit 78 has an input connected to an output of the adder circuit 48 in Rake finger 10, and has its other inputs connected to the respective output of the adder circuit in the other Rake fingers. An output of the adder circuit 78 is connected to an input of a scaling circuit 104. The limiting circuit 92 has an output connected to a further input of the half linear multiplying circuit 90 and to an input of a delay circuit 98. An output of the half linear multiplying circuit 90 is connected to a further input of the multiplying circuit 94. An output of the multiplying circuit 94 is connected to an input of an average and hold circuit 96 the output of which is connected to an input of a multiplying circuit 101 and an input of a multiplying circuit 102. The delay circuit 98 has an output connected to a complex interferer A spreader circuit 100 which has two output lines connected to a further input of the multiplying circuit 101 and multiplying circuit 102 respectively. An output from each of the multiplying circuits 101, 102 is connected to an input of an adder circuit 118, 120 respectively. The limiting circuit 88 has an output connected to a further input of the half linear multiplying circuit 86 and to an input of the delay circuit 110. The half linear multiplying circuit 86 has an output connected to an input of a multiplying circuit 106. The multiplying circuit 106 and the multiplying circuit 94 each have a further input connected to an output of the scaling device 104. The multiplying circuit 106 has an output connected to an input of a average and hold circuit 108, the output of which is connected to an input of a multiplying circuit 114 and to an input of an a multiplying circuit 116. The delay circuit 110 has an output connected to an input of a complex interferer B spreader circuit 112 which has two output lines each connected to a further input of the multiplying circuits 114, 116 respectively. An output from each of the multiplying circuits 114, 116 is connected to a further input of the adder circuits 118 and 120 respectively. The adder circuits 118, 120 have an output connected to an input of a transmit receive filter 112, 124 respectively, the outputs of which are connected to the input of the delay circuit 70 and the delay circuit 68 respectively in each Rake finger.

The I and Q signal lines are also connected to an input of a delay circuit 128 and a delay circuit 126 respectively, the outputs of which are connected to an input of a subtractor circuit 130, 132 respectively, each of which are also connected, at a second input thereof, to an output of the adder circuits 80, 82 respectively. The output from the subtractor circuits 130, 132 are connected to a respective input of the delay circuit 64 in each of the Rake fingers. The adder circuit 84 is connected to an output of the adder circuit 62 and the corresponding adder circuit in each of the other Rake fingers. The output of the adder circuit 84 represents the receiver output signal and is generated an output line 134.

The operation of the circuit shown in FIG. 4 will now be described.

FIG. 4 shows a cancellor for the case of a three finger Rake receiver, cancelling two interfering signals, A and B in order to receive a signal. The interfering signals are assumed, for this case, to have been received from the same base station, so the multipath characteristic is the same for both of them. It is also the same as the signal's, and can be estimated from a pilot signal.

The wideband complex baseband signal I, Q is received at the cancelling receiver, and the inphase and quadrature components pass into each of the three Rake fingers 10, 12, 14, but this description, without loss of generality, will focus on Rake finger 10. It is assumed that the Rake fingers have all been suitably synchronised onto the three dominant multipath components by determining the signal delays associated with each path PD1, PD2 and PD3. A delay, T-PD1 is inserted into the signal path for Rake finger 10 by delay circuit 16. This brings the delay for each wanted path to approximately T (to the resolution available from the sampling of the received signal). T is chosen to exceed the greatest delay over all paths.

The pilot signal is despread by the Complex Pilot 1 Correlator 18 having a delay PD1. If different inphase and quadrature phase spreading codes have been used in the spreading sequence to generate the pilot, this will need to be a full complex correlator involving four real correlators. The inphase and quadrature despread pilot outputs are noisy but have a bandwidth limited by the doppler fading rate. For the inphase and quadrature signals a symmetrical Wiener-like filter 24, 26 is used respectively to provide an estimate of the pilot signal with better signal to noise ratio. This filter has a delay, D1.

Interferer A, 20 is despread in the same way as the pilot signal with a complex correlator fed with the spreading code, of that interferer. At this stage, the requirement is to use the pilot signal to compensate the phase and amplitude of the interferer signal. A delay of D1 is inserted in the despread interferer A path by delay circuits 28, 30, to match the delay in the pilot estimate path caused by the Wiener-like filters 24, 26. The pair of multipliers 40, 42 and adder circuit 50 then perform the calculation Re{P*A} to produce a phase aligned, weighted signal. This and corresponding signal components are added across the Rake fingers to produce a maximal ratio combined signal at the output of the adder circuit 76.

A hard limiter 92 at the output of adder circuit 76 performs decisions on interferer A's data. These decisions are used to reconstruct the interferer A, for the purpose of subtraction (i.e. cancellation). In order to perform the correct cancellation, the amplitude of interferer A must be estimated. This is done using the output of the adder circuit 76. The modulation is stripped off by the half linear multiplying circuit 90, and the samples are weighted, using an output derived from the pilot estimators by use of multiplying circuits 36, 38, adder circuits 48, 78, scaling circuit 104, and the multiplying circuit 94.

Suppose the interferer. A(t) is transmitted over a path with complex baseband impulse response h(t) where, $$h(t) = \sum_{i=0}^{n-1} a_i(t) \cdot \exp j\theta_i(t) \cdot \delta(t - \tau_i)$$

Then the received interfering, signal, A, will be:

$$A_r(t) = \sum_{i=0}^{n-1} a_i(t) \cdot \exp j\theta_i(t) \cdot A(t - \tau_i)$$

The pilot, P(t) will also have been transmitted over this same path and will be used to derive estimates of the various $a_i$ s and $\theta_i$ s for the values of $\tau$, $96_i$ for which the $a_i$ s are significant. These estimates will be proportional to the transmitted pilot voltage and will have the form P(t-D1).k.â$_i$ (t-D1). The delay of D1 is due to the delay in the Wiener-like filter.

The Rake receiver effectively convolves the received signal (delayed by D1) by the set of received tap weights at the appropriate delays taking the real part only.

Thus the output is:

$$R(t) = R\left\{ k \cdot P(t-D1) \sum_{i=0}^{N-1} \sum_{j=0}^{N-1} a_i(t-D1) \cdot \hat{a}_j(t-D1) \cdot \right.$$

$$\left. \exp j(\theta_i(t-D1) - \hat{\theta}_j(t-D1)) \cdot A(t-T-D1-(\tau_i-\tau_j)) \right\}$$

We can simplify by assuming that $a_i = \hat{a}_i$ and $\theta_i = \hat{\theta}_i$ and decomposing to obtain:

$$R(t) = R\left\{ k \cdot P(t-D1) \sum_{i=0}^{N-1} a_i^2(t-D1) \cdot A(t-T-D1) \right\} +$$

$$R\left\{ k \cdot P(t-D1) \sum_{\substack{i=0 \\ j \neq i}}^{N-1} \sum_{j=0}^{N-1} a_i(t-D1) \cdot \hat{a}_j(t-D1) \cdot \exp j(\theta_i(t-D1) - \right.$$

$$\left. \hat{\theta}_j(t-D1)) \cdot A(t-T-D1-(\tau_i-\tau_j)) \right\}$$

Now the second term consists only of signals which have not been synchronised to the spreading code so these will be significantly suppressed by the processing gain. Moreover, since all elements of interest have been co-phased the Real operator may be dropped. Thus we have:

$$A_{DS}(t) = k \cdot P(t-D1) \sum_{i=0}^{N-1} a_i^2(t-D1) \cdot A(t-T-D1)$$

Now if we take the individual estimates of the paths P(t-D1).k.â$_i$(t-D1) and square and add them we obtain (again assuming $a_i = \hat{a}_i$) the normaliser, (N(t):

$$N(t) = k^2 \cdot P^2(t-D1) \sum_{i=0}^{N-1} a_i^2(t-D1)$$

Dividing by ADS(t) by N(t) we obtain $$\frac{A_{DS}(T)}{k \cdot P(T-D1)}$$

Note that although the pilot voltage is shown as a function of time, its peak voltage will be constant so that $$\frac{A_{DS}(T)}{N(t)}$$

is essentially a constant measure of the transmitted signal level. This may itself be constant permitting long term averaging or may be varied in response to downlink power control requests from the mobile receiving the transmission, A(t) as its wanted signal. If this is the case then the longest permissible period of averaging is the period between adjacent power control updates. This averaging is shown taking place in the average and hold circuit 96, where the delay D2 is assumed to be equal to this period between adjacent power control updates. Averaging is performed by integrating over this period, scaling and holding the value for output during the following period. Thus there is a fixed, further delay of D2. At this point the demodulated data also further delayed by D2 by delay circuit 98 and is fed to a spreading circuit 100 which is running the interferer's spreading code (with phase synchronised to the data—i.e. delayed by order D1+D2+T with respect to the receiving correlators) to generate a new version of the interferer. This signal is scaled (multipliers 101, 102) by $$\frac{A_{DS}(t)}{N(t)}$$

so that we should now have $$\frac{\hat{A}_{(t-D1-D2-T)}}{k \cdot P(t-D1-D2)}$$

The signal is now applied to a pair of adders 118, 120 and filters 122, 124 to reproduce the effects of the transmit and receive filters for the original transmitted signal; these filters have delay D3. The signal is then fed back via delay circuits 60, 68 respectively to the complex multiplying circuit 66 where it is multiplied with scaling signals derived from the pilot, delayed by D2 to match the timing and suitability delayed. The output signals from the complex multiplying circuit 66 are applied respectively to the adder circuits 80, 82, the output of which is applied to a subtractor circuit 130, 132 respectively together with the I and Q signals which are delayed by circuits 128, 126 from which they are subtracted. Essentially this operation emulates transmission of the newly generated signal over the estimate of the transmission path. Note that all coefficients are scaled by k.P(t-D1-D2-D3). This cancels the denominator of the scaled signal to obtain a correctly scaled complex copy of the signal, A.

The second interferer, B, is processed in exactly the same way using the half linear multiplying circuit 86, multiplying circuit 106, hard limiting circuit 88, delay circuit 110, spreader circuit 112, average and hold circuit 108, and multiplying circuits 114, 116 (for scaling) all of which operate in exactly the same manner described with respect to interferer A. Note that much of the circuitry is common to A (because the two signals have been received over the same paths). After cancellation of the two signals (A and B), the wanted signals can be demodulated. In the case where the wanted signal is received from the same source as the interfering signals, the channel estimates derived from the pilot are valid for demodulation of the wanted signal. These pilot signals must be delayed by D2 and D3 to match them in time to the cancelled signal and then demodulation is permitted by Rake reception in the conventional fashion.

Figure 5:
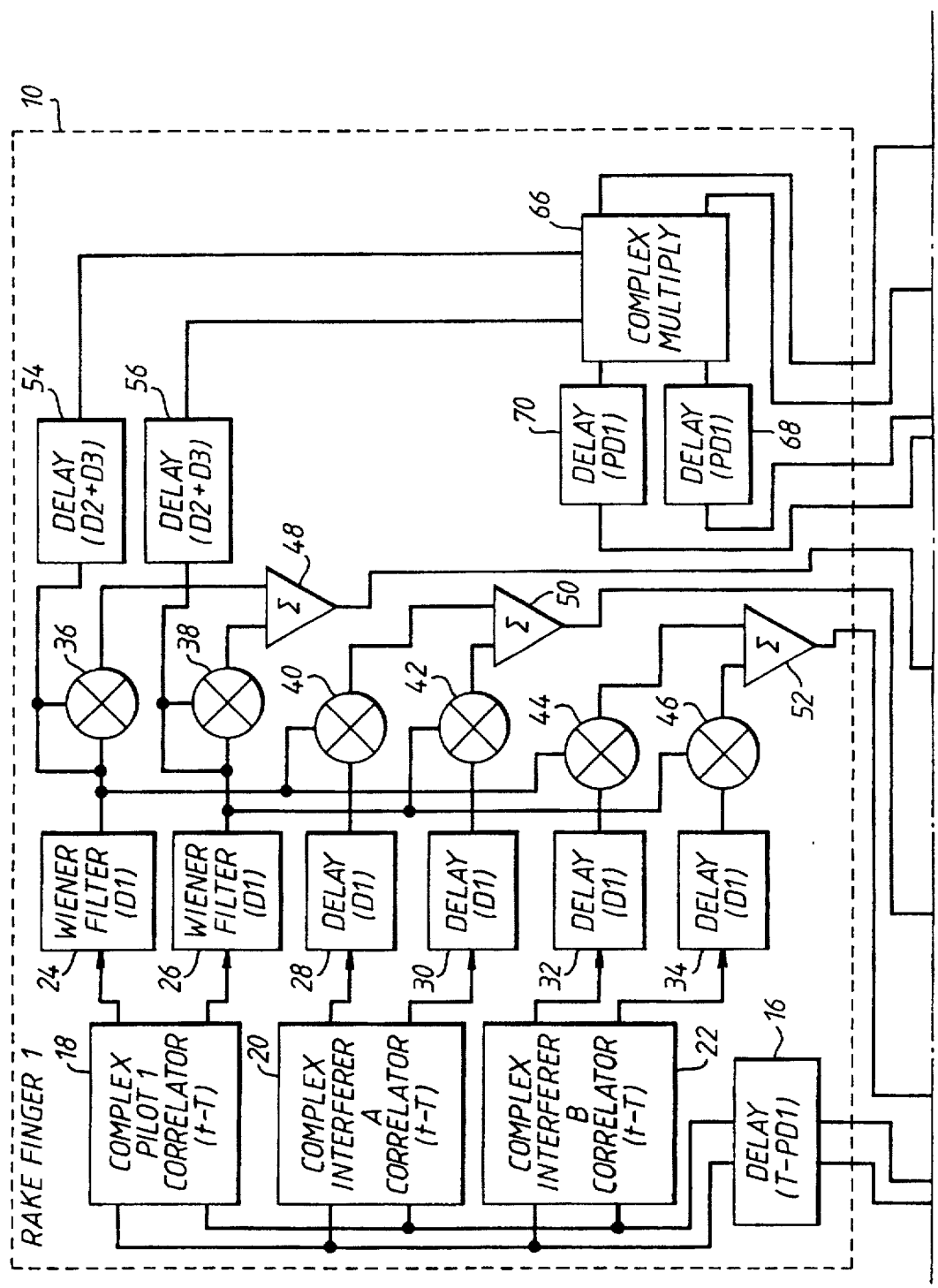
FIG. 5 shows an interference cancellor for interference emanating from other base stations.
Figure 5:
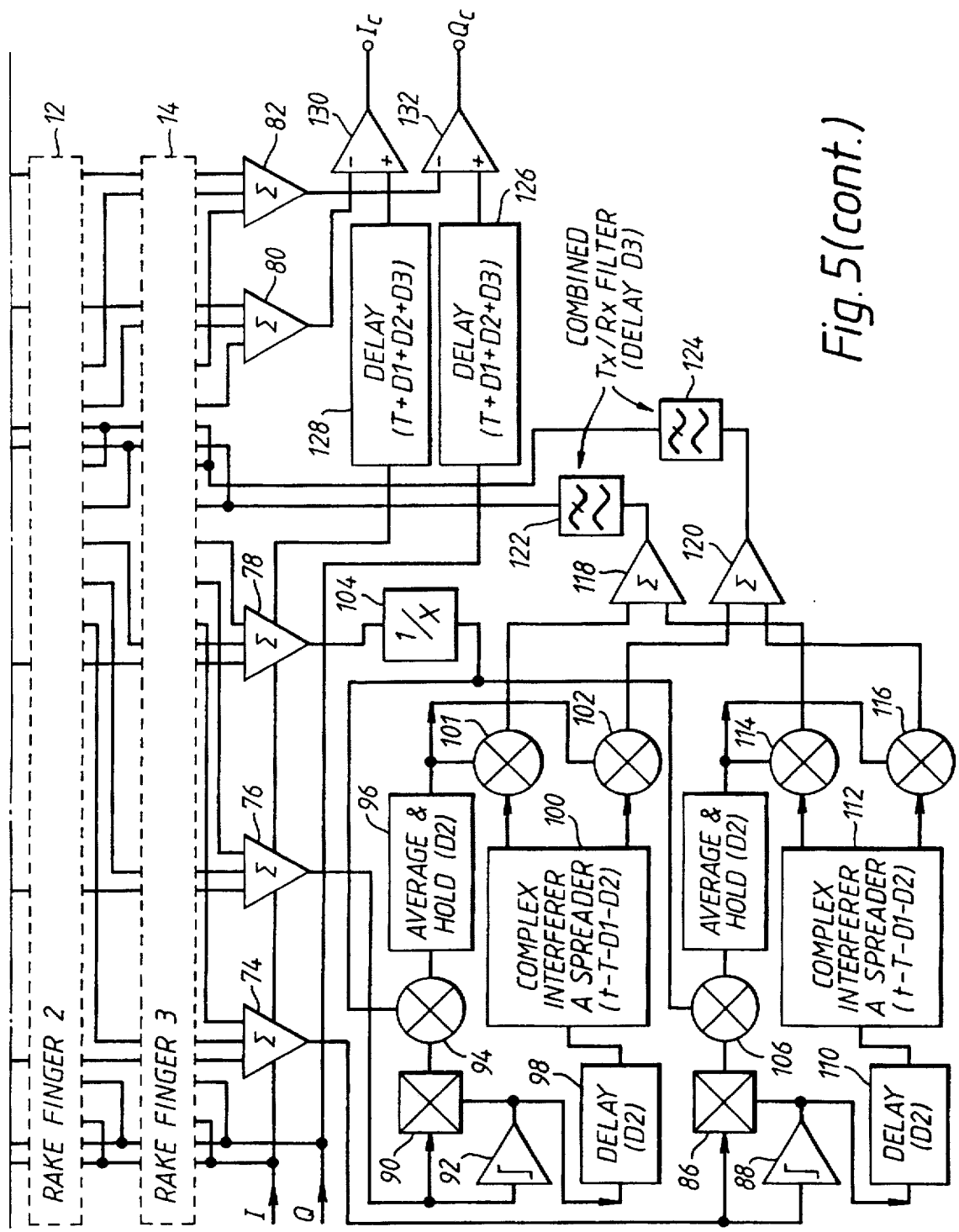

Referring to FIG. 5, the block diagram for a cancellor in which the interference comes from a different base station from the wanted signal is shown. It will be appreciated that the circuit is similar to that described above with reference to FIG. 4, and operates in the same manner, and the same references have been used throughout.

There is no need for the complex correlator 72, multiplying circuits 58, 60, adder circuit 62, delay circuit 64, and the adder circuit 84 for the following reasons.

It is not possible to use the pilot signals derived from the interfering base station for the purposes of reception of the wanted signal from its base station. The outputs of the cancellors $I_c$ and $Q_c$ are therefore fed to a separate receiver with pilot correlators running, the spreading code appropriate for the wanted signal's base station as opposed to the spreading code for the interfering base station. Since the multipath components from the base station transmitting the wanted signal will, in general, arrive at different times from those from the base station transmitting the interfering signals, there is no one to one correspondence between the Rake fingers for the wanted signal and interference receivers.

There are two options for the wanted signal receiver in this case:

1) Pilots for wanted signal reception by correlation against $I_c$ and $Q_c$. In this case the pilot signal to noise ratio benefits from cancellation of the two unwanted signals. On the other hand, demodulation of the wanted signal is subject to a further delay of D1, for the derivation of the Wiener filtered pilot estimates.

2) Pilots for wanted signal reception by correlation against I and Q. Here there need be no additional delay. However, the signal to noise ratio of the pilot is affected by the interference from interferers A and B (and, more generally, C, D, E, etc).

Figure 6:
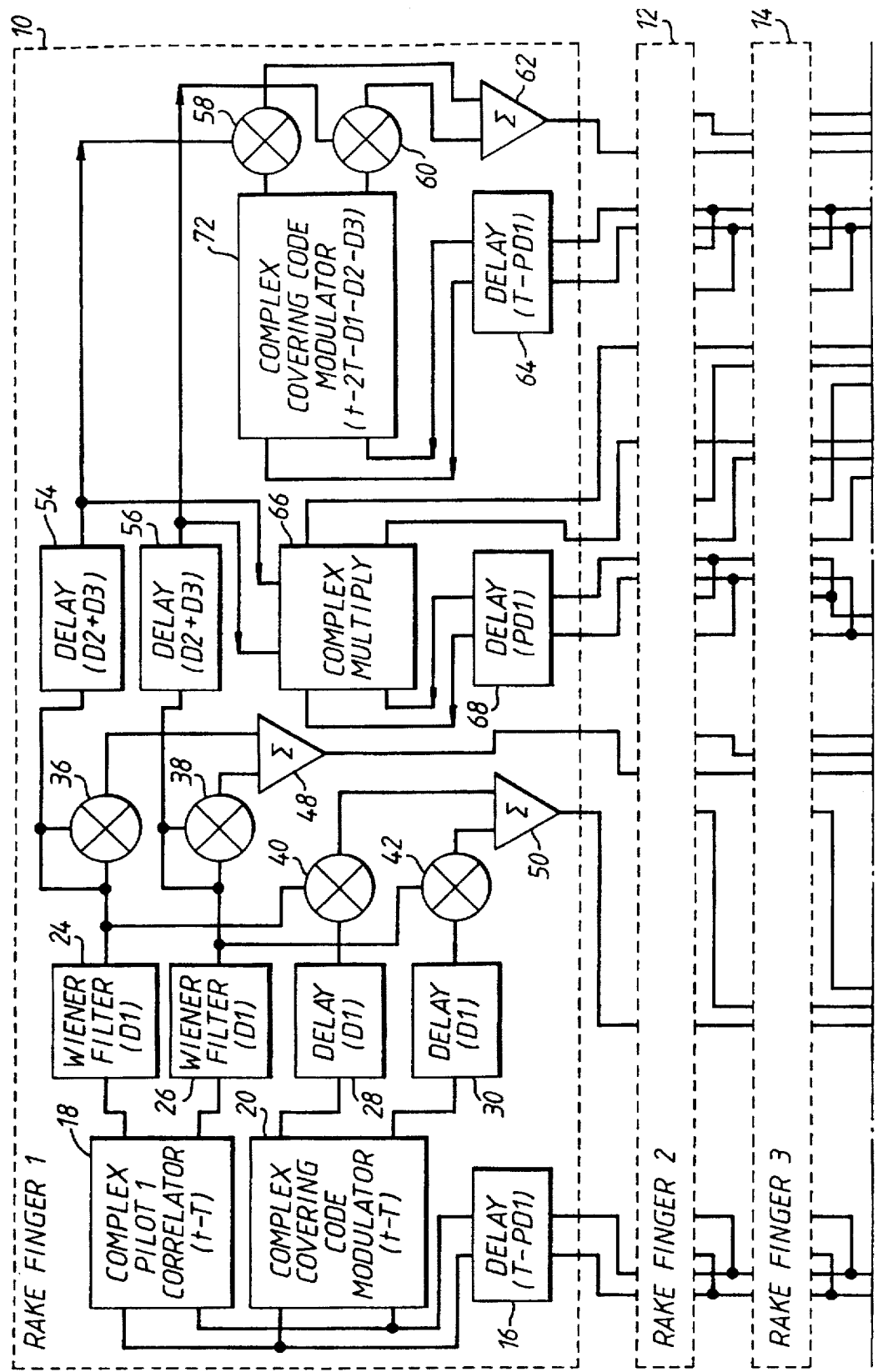
FIG. 6 shows an interference cancellor for interference emanating from the same base station, and using a pre-combining Rake receiver.
Figure 6:
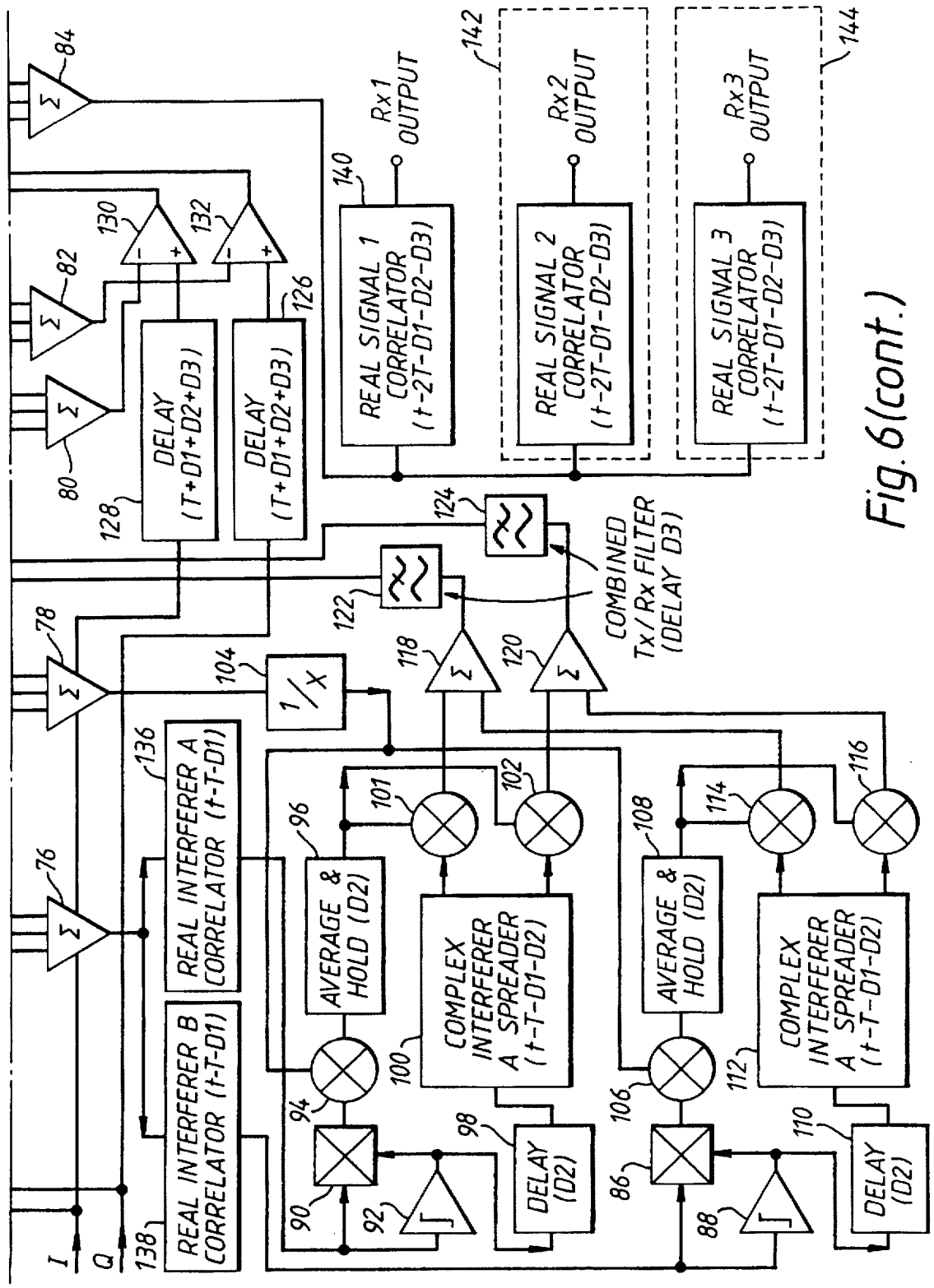

The invention is also suitable for use with a pre-combining Rake receiver. The pre-combining Rake receiver provides reduced hardware complexity when a single receiver is required to demodulate several wanted signals, received on different codes in parallel. This ability can be particularly useful for interference cancellation when a significant number of signals from a common base station require cancellation. FIG. 6 shows the architecture for a pre-combining Rake receiver designed for interference cancellation for interfering signals from the same base station as the wanted signal(s).

The operation is very similar to that of the circuit of FIG. 4 and the same reference numerals have been used to identify like circuit elements. The main difference is that the interfering signals are not despread in the Rake fingers, but are suitably delayed and complex weighted to align the chip phases, align the phases and weight the amplitudes. Also, any complex covering code, common to all signals may be removed at this stage. The pre-processed signals are then added together in the adder circuit 76. The output of the added circuit 76 is then processed by the A and B correlators 136, 138 to obtain the demodulated interfering signals. After this stage, the processes for synthesis of cancelling signals are identical to those shown and described with reference to FIG. 4.

FIG. 6 illustrates the use of pre-combining Rake following the cancellation stage for demodulation of the wanted signal(s) and illustrates the demodulation of up to three signals in parallel. The use of pre-combining Rake at this stage is entirely optional its use in the cancellation stage carries no implications for its use in the reception stage. Note that the complex covering code is assumed to be included in the complex interferer A spreader (t-T-D1-D2) and similarly for complex interferer B. The output signals are generated by the correlators 140, 142 and 144.

Figure 7:
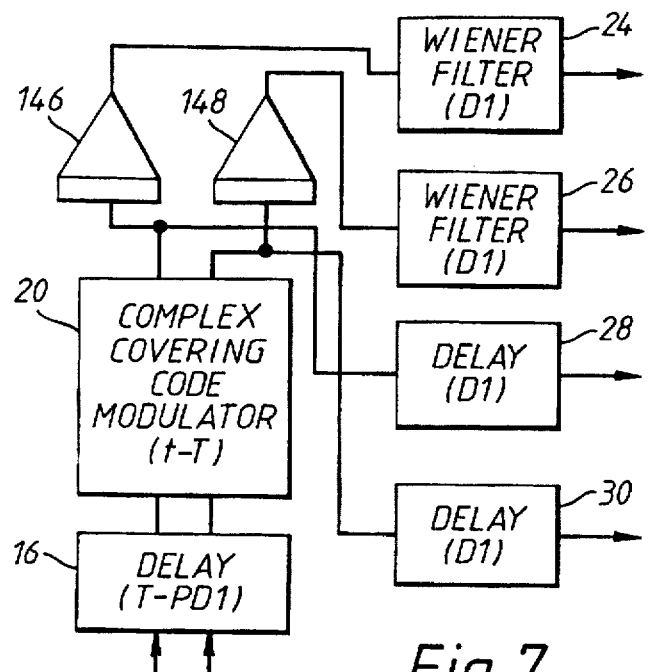
FIG. 7 shows a block diagram of alternative signal and pilot correlators.

There are several possible variations to the circuitry described above. Firstly, if the pilot code is identically equal to the covering phase randomisation code then the pilot correlator 18 is not used and the outputs from the complex covering and modulator 20 are connected to the delay circuits 28, 30 as before, and to the Wiener filters 24, 26 by way of integrators 146, 148, as shown in FIG. 7.

Figure 8:
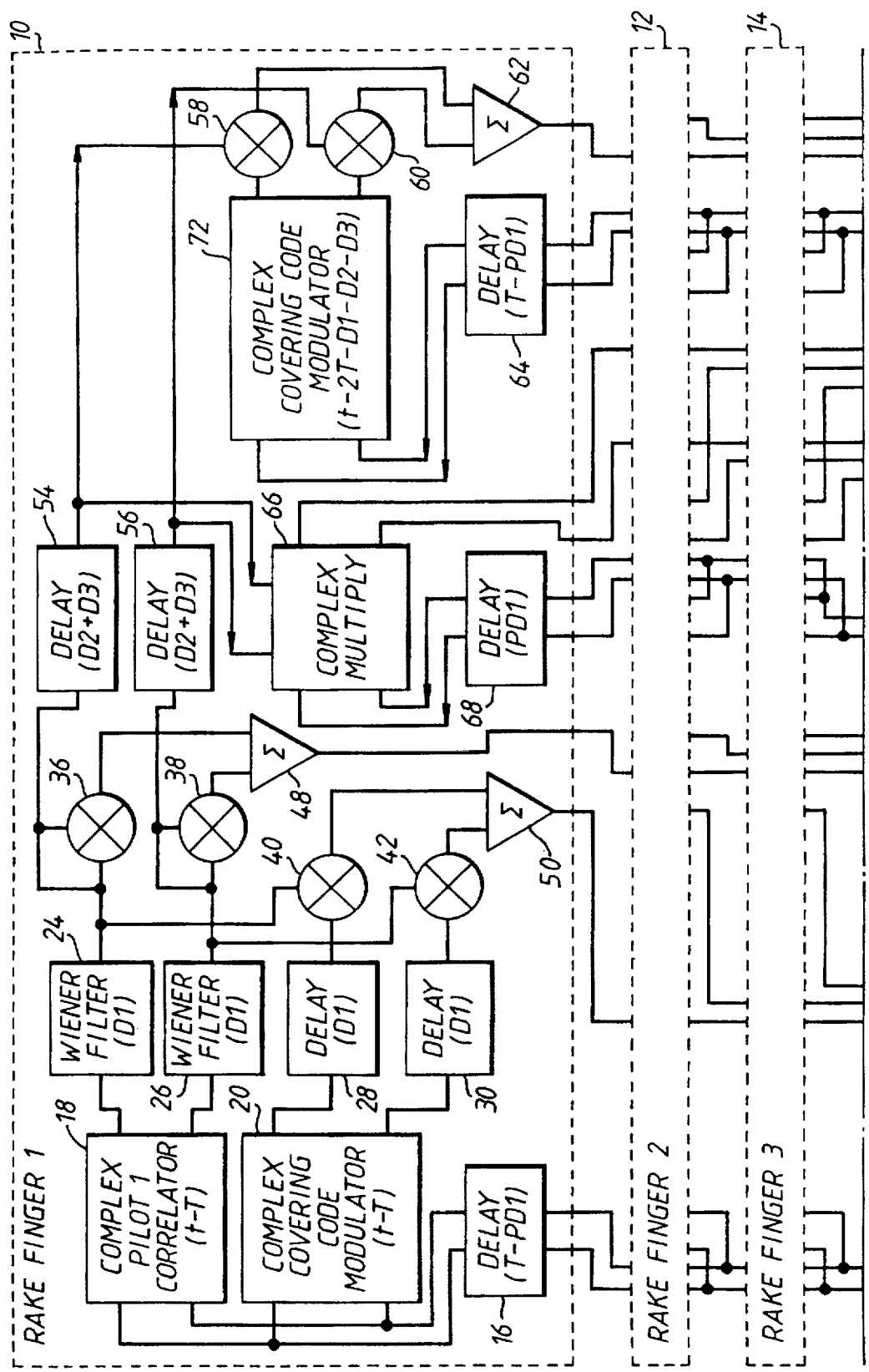
FIG. 8 shows a block diagram of an interference cancellor for interference emanating from the same base station, and using a pre-combining Rake receiver and post combiner cancellation.
Figure 8:
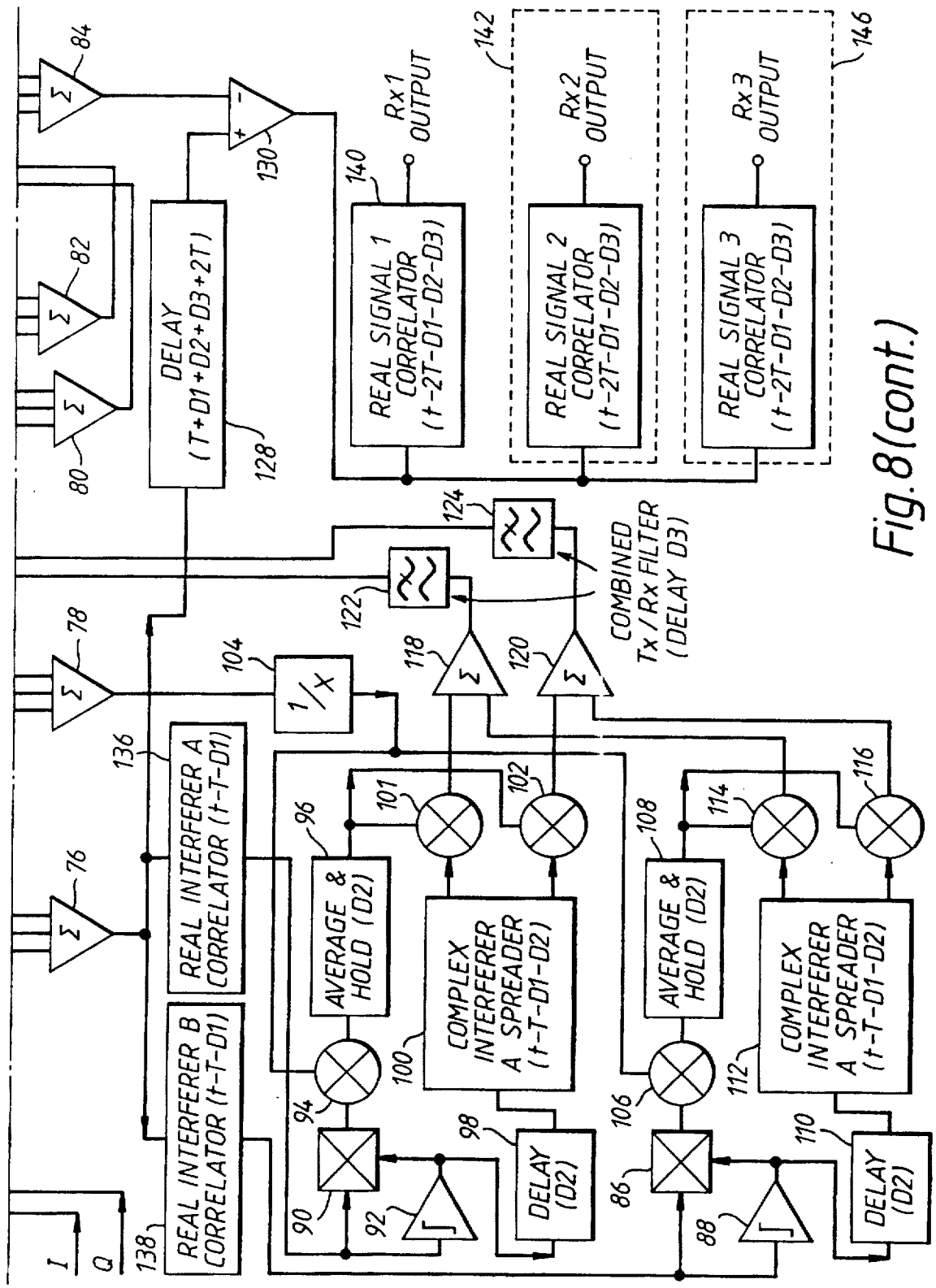

Another variation would be to perform the cancellation at the output of the pre-combining Rake point. In this case the architecture would be as shown in FIG. 8, where again like circuit elements have been given the same reference numeral. The input signals I, Q are applied to the delay circuit 16 only. The output from the adder circuit 76 is applied to the A and B correlators 136, 138 as before and to the delay circuit 128, which now includes a further delay element 2TL, the output of which is applied to the subtractor circuit 130 which also receives the output from the adder circuit 84. There is no need for the delay circuit 126 and the subtractor circuit 132. Furthermore, the outputs from the adder circuits 80, 82 are applied directly to the delay circuit 64. The output of the adder circuit 130 is applied to the correlators 140, 142 and 146.

Figure 9:
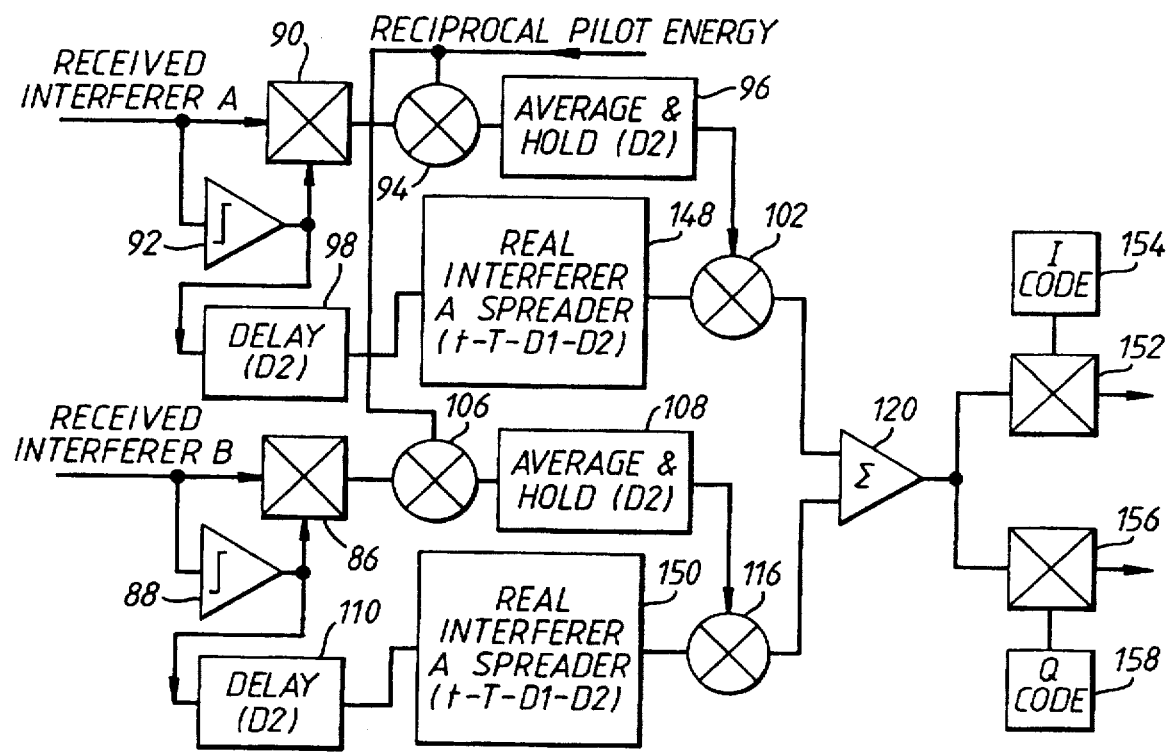
FIG. 9 shows an alternative configuration for remodulating interferers.

Referring to FIG. 9, an alternative configuration is shown for re-modulating the interferers.

This circuit replaces elements 90 to 102, 106 to 120 in FIGS. 4 to 6 and 8. In FIG. 9, only real spreading circuits 148, 150 are used for generating the individual signals. These are then scaled and added before the common complex spreading code is applied by the I code circuit 154 and the half linear multiplying circuit 152, and by the Q code circuit 158 and the half linear multiplying circuit 156.

It will readily be appreciated by those skilled in the art that modifications to the above described circuitry is possible within the spirit and scope of the present invention. For example, if a strong pilot is transmitted then the performance of the receivers can be enhanced through reduced combiner loss. However, the pilot itself is a significant source of interference so it is usually necessary to tradeoff combiner loss against the increased interference level. If, however, the pilot(s) can be cancelled, this tradeoff can be removed, permitting larger pilot signals to be transmitted without any increase in interference. This cancellation is readily performed by adding a constant level pilot spreading circuit into the adder circuits 118, 120.

Also, it would be possible to cancel interfering signals both from the same base station and from other base stations and therefore a combination of the circuitry shown in FIGS. 4 and 5 could be implemented.

It will also be readily appreciated that although the embodiments describe cancellation for two interfering signals a plurality of the circuits necessary for demodulation and remodulation of the interfering signals may be incorporated into the various embodiments to permit the cancellation of a corresponding plurality of interferers.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An apparatus for use in equipment providing a digital radio link between base stations and mobile units of a mobile radio system, said apparatus comprising: means for affiliating a first base station of the base stations with a first mobile unit, and cancellation means for canceling at least one interfering signal transmitted by at least one of the first base station and a second base station to a second mobile unit and received by the first mobile station as a result of the first mobile unit being affiliated to the first base station, when the first base station produces non-optimum reception, said cancellation means including a plurality of Rake fingers arranged to receive an inphase and quadrature phase input signal, wherein each Rake finger includes a first correlator connected to Wiener filter means for detecting a pilot signal from a base station, at least one second correlator for detecting said at least one interfering signal, a third correlator, and at least one corresponding interferer spreading means connected to said Rake fingers and arranged in combination with said second correlator to regenerate said interfering signal, a plurality of scaling means for scaling outputs of said interferer spreading means in accordance with signals derived from signals generated by said second correlator, combining means for combining outputs from said scaling means, and filtering means for reproducing transmit and receiver filter effects on signals output from the scaling means, a multiplying means receiving output signals from the filtering means and scaling signals derived from the Wiener filter means for generating said interfacing signals to be subtracted from said input signals to said third correlator, from which said third correlator operates by to generate an interference free signal, thereby obviating a need to provide the mobile radio system with apparatus for effecting a soft hand-off or an instantaneous hard hand-off.

2. The apparatus as claimed in claim 1, wherein the multiplying means is structured to scale signals received from the filtering means and scaling signals derived from the Wiener filter means for generating signals to be subtracted from said input signals to said third correlator from which an interference free signal is produced.

3. The apparatus as claimed in claim 1, wherein interfering signals are received from different base stations and the cancellation means has a plurality of Rake fingers arranged to receive an inphase and quadrature phase input signal and each Rake finger includes a first correlator for handling a pilot signal, at least one second correlator for handling at least one corresponding interfering signal, and multiplying means; said apparatus further comprising at least one interferer spreading means connected to said Rake fingers and arranged to spread said interfering signal, a plurality of scaling means for scaling outputs of said interferer spreading means in accordance with signals derived from signals generated by said second correlator, combining means for combining outputs from said scaling means, and filtering means for reproducing transmit and receiver filter effects on signals output from the scaling means, said multiplying means receiving output signals from the filtering means and scaling signals derived from the first correlator for generating output signals to be applied to subtractor means which also receive delayed version and the inphase and quadrature phase input signals from which an interference free signal is produced.

4. The apparatus as claimed in claim 1, wherein the cancellation means includes a plurality of Rake fingers arranged to receive an inphase and quadrature phase input signal, each Rake finger having a first correlator connected to Wiener filter means for handling a pilot signal received from a base station, first modulation means for handling at least one interfering signal received from the base station, and second modulation means for receiving delayed and modified versions of the inphase and quadrature phase input signal, and multiplying means; said apparatus further comprising at least one second correlator for receiving a signal derived from the first correlator and first modulation means, at least one interferer spreading means connected to said at least one second correlator and arranged to spread said interfering signal, a plurality of scaling means for scaling outputs of said interferer spreading means in accordance with signals derived from signals generated by said at least one second correlator, combining means for combining outputs from said scaling means, and filtering means for reproducing transmit and receiver filter effects on signals output from the scaling means, said multiplying means receiving output signals from the filtering means signals and scaling signals from the Wiener filter means for generating signals to be applied to said second modulation means from which at least one interference free signal is produced.

5. The apparatus as claimed in claim 4, wherein said apparatus is a pre-combining Rake Receiver.

6. The apparatus as claimed in claim 5, wherein said first modulation means has an output connected to an input of said Wiener filter means via an integration means.

7. The apparatus as claimed in claim 5, wherein the inphase and quadrature phase input signals are connected only to said first modulation means, and said second modulation means receives signals indicative of a sum of signals generated by each multiplying means.

8. The apparatus as claimed in claim 2, wherein the interferer spreading means comprise two real spreading means and a common spreading code is applied after an output from each spreading means is scaled and summed.

9. The apparatus as claimed in claim 2, wherein a plurality of interferers is cancelled by said cancellation means.

10. The apparatus as claimed in claim 1, wherein interference from a plurality of base stations is cancelled by said cancellation means.

11. The apparatus as claimed in claim 3, wherein the interferer spreading means comprise two real spreading means and a common spreading code is applied after an output from each spreading means is scaled and summed.

12. The apparatus as claimed in claim 3, wherein a plurality of interferers is cancelled by said cancellation means.

13. The apparatus as claimed in claim 4, wherein the interferer spreading means comprise two real spreading means and a common spreading code is applied after an output from each spreading means is scaled and summed.

14. The apparatus as claimed in claim 4, wherein a plurality of interferers is cancelled by said cancellation means.

15. An apparatus for use in equipment providing a digital radio link between base stations and mobile units of a mobile radio system, said apparatus comprising: a first mobile station affiliated with a first base station; and a receiver in said first mobile station having cancellation means for canceling at least one interfering signal transmitted by at least one of the first base station or a second base station to a second mobile unit and received at the first mobile unit as a result of the first mobile unit being affiliated to the first base station, which results in non-optimum reception, said cancellation means having a plurality of Rake fingers arranged to receive an inphase and quadrature phase input signal, each Rake finger includes a first correlator connected to Wiener filter means for detecting a pilot signal from a base station, at least one second correlator for detecting at least one corresponding interfering signal received from the base station, a third correlator, and at least one corresponding interferer spreading means connected to said Rake fingers arranged in combination with said second correlator to regenerate said interfering signal, a plurality of scaling means for scaling outputs of said interferer spreading means in accordance with signals derived from signals generated by said second correlator, combining-means for combining outputs from said scaling means, and filtering means for reproducing transmit and receiver filter effects on signals output from the scaling means, a multiplying means receiving output signals from the filtering means and scaling signals derived from the Wiener filter means for generating signals to be subtracted from said input signal to said third correlator from which said third correlator operates to generate an interference free signal, thereby obviating a need to provide the mobile radio system with apparatus for effecting a soft hand-off or an instantaneous hard hand-off.

16. The apparatus as claimed in claim 15, wherein the multiplying means is structured to scale signals received from the filtering means and scaling signals derived from the Wiener filter means for generating signals to be subtracted from said input signals to said third correlator from which an interference free signal is produced.

17. The apparatus as claimed in claim 15, wherein interfering signals are received from different base stations and the cancellation means has a plurality of Rake fingers arranged to receive an inphase and quadrature phase input signal and each Rake finger includes a first correlator for handling a pilot signal, at least one second correlator for handling at least one corresponding interfering signal, and multiplying means; said apparatus further comprising at least one interferer spreading means connected to said Rake fingers and arranged to spread said interfering signal, a plurality of scaling means for scaling outputs of said interferer spreading means in accordance with signals derived from signals generated by said second correlator, combining means for combining outputs from said scaling means, and filtering means for reproducing transmit and receiver filter effects on signals output from the scaling means, said multiplying means receiving output signals from the filtering means and scaling signals derived from the first correlator for generating output signals to be applied to subtractor means which also receive delayed version and the inphase and quadrature phase input signals from which an interference free signal is produced.

18. The apparatus as claimed in claim 15, wherein the cancellation means includes a plurality of Rake fingers arranged to receive an inphase includes a plurality of Rake fingers arranged to receive an inphase and quadrature phase input signal, each Rake finger having a first correlator connected to Wiener filter means for handling a pilot signal received from a base station, first modulation means for handling at least one interfering signal received from the base station, and second modulation means for receiving delayed and modified versions of the inphase and quadrature phase input signal, and multiplying means; said apparatus further comprising at least one second correlator for receiving a signal derived from the first correlator and first modulation means, at least one interferer spreading means connected to said at least one second correlator and arranged to spread said interfering signal, a plurality of scaling means for scaling outputs of said interferer spreading means in accordance with signals derived from signals generated by said at least one second correlator, combining means for combining outputs from said scaling means, and filtering means for reproducing transmit and receiver filter effects on signals output from the scaling means, said multiplying means receiving output signals from the filtering means signals and scaling signals from the Wiener filter means for generating signals to be applied to said second modulation means from which at least one interference free signal is produced.

19. The apparatus as claimed in claim 18, wherein said apparatus is a pre-combining Rake Receiver.

20. The apparatus as claimed in claim 15, wherein interference from a plurality of base stations is canceled by said cancellation means.

* * * * *